Patented Mar. 25, 1947

2,418,026

UNITED STATES PATENT OFFICE 2,418,026

REFRACTORY FUSED FORSTERITE

Victor Moritz Goldschmidt, Craigiebuckler, Aberdeen, Scotland

No Drawing. Application January 1, 1945, Serial No. 571,029. In Great Britain January 24, 1944

14 Claims. (Cl. 75—31)

This invention relates to highly refractory fused or sintered forsterite (essentially a magnesium orthosilicate of the formula $2MgO.SiO_2$) and to highly refractory products rich in such fused or sintered forsterite.

Refractory fused forsterite has been made by fusing such materials as calcined magnesite and flint, or mixtures of natural or calcined olivine rock, such as dunite, with magnesia, or magnesite, in an electric arc furnace. As natural dunite rock contains a considerable amount of iron, usually about 6 to 11 per cent, calculated as FeO, it has been considered necessary in the production of forsterite from such rock to add carbon to the batch to reduce iron oxide and part of the silica contained in the raw materials, to form ferrosilicon.

It is also known to use forsterite or mixtures of forsterite and periclase (MgO) for making refractories. The present invention includes products consisting solely of forsterite or containing predominating amounts of forsterite, e. g., amounts of forsterite down to 60% with up to 40% of periclase. The atomic proportions of magnesium and silicon in the batch may vary from 2:1 to about 3.3:1.

Difficulties are met with in the known methods of manufacture above referred to and these result in products possessing great disadvantages when used as refractories. Thus, mixtures containing dunite and magnesite when heated with carbon to form forsterite and ferrosilicon in the electric furnace give a highly vesicular product, instead of a dense refractory. Such vesicular products are much more penetrable by aggressive slags in practical furnace service than dense non-vesicular refractory materials would be.

Further, one encounters the disadvantage that the ferrosilicon formed during the manufacture in the electric furnaces often does not separate from the silicate in large globules or as a separate mass but may, and commonly does, remain as tiny, often microscopically small, droplets suspended in the silicate. If such a silicate filled with small ferrosilicon specks is used for refractory purposes and is heated under even moderately oxidizing conditions, the ferrosilicon oxidises and the difference in expansion between ferrosilicon and iron silicates causes cracking and crumbling of the refractory forsterite, beside causing damage even if reducing conditions are again attained, as the iron silicates are very easily fusible, even at such moderate temperatures as about 1,200° C.

The surprising discovery has now been made that both the above-mentioned difficulties can be avoided and considerably improved dense highly refractory forsterite products obtained when the formation or temporary formation of silicon or ferrosilicon high in silicon is avoided. I have found, and it is upon this that the invention is in part predicated, that the formation of undesirable vesicular products is caused by the production of volatile compounds at high temperatures, if at the same time the refractory forsterite or olivine or the magnesium oxide is decomposed with formation of the much less refractory magnesium metasilicate $MgSiO_3$ the temperature of incongruent fusion of which is about 1,400 to 1,500° C., as compared with 1,900° C. for forsterite and 2,500° C. for magnesium oxide.

I have found that the following reactions take place, if silicon or ferrosilicon high in silicon is formed in the furnace. The arrows indicate the direction in which the reactions proceed at the high temperatures obtaining in the furnace. For the fifth reaction, the reaction seems to lead to equilibrium conditions.

$$Si+Mg_2SiO_4 \rightarrow MgSiO_3+MgSiO$$
$$Si+3MgO \rightarrow MgSiO_3+2Mg$$
$$Si+MgO \rightarrow SiO+Mg$$
$$Si+2MgSiO_3 \rightarrow Mg_2SiO_4+2SiO$$
$$SiO+2MgO \rightleftarrows MgSiO_3+Mg$$

At such temperatures the $MgSiO_3$ will be largely fused, forming a viscous paste with solid $Mg_2SiO_4$; the metallic magnesium and the silicon monoxide at such temperatures are gaseous and thereby a more or less vesicular product is formed, and even if by addition of MgO the composition is brought up to that required by the formula $Mg_2SiO_4$, the very undesirable structure remains in the finished product. The magnesium metasilicate ($MgSiO_3$) may either be present from the raw materials or formed by the reactions between magnesium orthosilicate and silicon.

The formation of the undesirable vesicular products is accompanied, as I have found, by the appearance of dense white and brown fumes in the uppermost parts of the electric furnace, resulting from oxidised magnesium vapour and more or less oxidised SiO, and deposits are formed which consist of a very fine powder containing magnesium, silicon and oxygen. In this way not only does loss of part of the raw materials take place but also a waste of electrical energy and disturbances in the working of the furnace resulting from the formation or temporary formation of silicon from magnesium silicates. This formation of silicon or of silicon monoxide is especially apt to occur if magnesium silicates are brought into direct contact with solid carbon, such as carbon electrodes, coke or anthracite at very high temperatures, e. g., 1,650° C. or above, and such contact with carbon must be avoided as much as possible.

The formation of fine droplets of ferrosilicon, dispersed in the magnesium silicates, which droplets after solidifying remain in the products as they are too small for gravitational or magnetic separation, is likewise due to an excessive amount of silicon, i. e., a high percentage of silicon reduces the specific gravity of the alloy to such an extent that gravitational separation in the liquid state is not fully effected.

I have discovered that if the process of sintering or fusing forsterite for making a highly refractory material is conducted in such a manner that the amount of silicon reduced to the metallic or alloy state is kept as low as possible, and thereby also the formation of magnesium vapour or silicon monoxide vapour is prevented, undesirable vesicular products and undesirable small droplets of silicon alloy are avoided as well as also the presence of inflammable vapours of magnesium and of silicon monoxide, which in the presence of air often given rise to dangerous explosions.

The formation of objectionable amounts of silicon or of alloys rich in silicon can be avoided by employing one or more of the following steps in the manufacture of sintered or fused forsterite, e. g., from raw materials consisting essentially of natural or calcined dunite or serpentine rocks, or mixtures of such rocks with magnesium oxide such as sintered magnesite:

(1) The employment of only a very limited amount of solid carbonaceous reducing substances such as coke or anthracite in the batch, viz., an amount not exceeding that needed for reduction of iron and related metals, such as nickel and cobalt.

(2) The addition to the charge, either initially or during some stage in the manufacture, of ores of the four metals lying on opposite sides of iron in the periodic system of elements, i. e., chromium, manganese, cobalt and nickel, in order to produce a ferrous alloy of one or more of the said elements, and keeping down the silicon content of the alloy and rendering the metal alloy easily separable from the forsterite.

(3) The addition of iron or oxidic iron ore for the purpose set forth under 2 above.

(4) The employment as reducing agent, instead of or in addition to carbon, of ferrochromium in order to remove iron from the silicates and to introduce refractory chromium compounds to the forsterite refractory.

(5) The employment of a reducing gas such as carbon monoxide or producer gas replacing part or all of the solid carbonaceous material such as anthracite or coke.

(6) The bringing of any excess of solid carbon or anthracite and magnesium silicate or oxide into direct contact must be particularly avoided.

The four metals named under item 2 above constitute a group of materials lying on either side of iron in the periodic system which have atomic numbers between 24 and 28. When iron is present in the rock or is added in accordance with item 3 above, the group consists of the five metals having atomic numbers between 24 and 28.

It will be understood that in all calculations relating to reducing reactions during sintering or fusion due allowance must be made for reducing materials introduced as components of the electrodes or as constituents of the furnace itself and for the oxidising effects of air and water vapour and carbon dioxide.

The batch, consisting of materials rich in magnesium orthosilicate or in materials reacting to produce magnesium orthosilicate, is heated in a furnace, preferably an electric furnace, such as an electric arc furnace, a resistance furnace, or a furnace which makes use or partial use of the heated and fused or sintered batch as a resistor at high temperatures.

The separation of forsterite refractory and metal alloy can take place by gravity in the liquid state and the liquid alloy and the fused forsterite refractory can be tapped off separately. The forsterite refractory can either be run into moulds to give blocks or other solid shapes on solidifying, or it may be left in the furnace or tapped to form a block to be comminuted after cooling.

The consumption of electrical power in making refractories in accordance with the present invention may be different for furnaces of different types and may differ with batches of different composition, and it may differ according to whether continuous or batch operation of the smelting or sintering process is used, but it is usually between 1,000 and 4,000 kilowatt-hours per ton of charge.

The methods of using the highly refractory products of the present invention as refractory building materials or as material for highly refractory moulds and the like are similar to those for using refractories made from other materials rich in magnesium orthosilicate, e. g., for making bonded, fired or unfired refractory shaped articles from the comminuted magnesium orthosilicate.

It will be understood that the term "magnesia" as used in the claims refers not only to magnesium oxide but also to compounds productive of the oxide such, for example, as the hydroxide and the carbonate.

According to the provisions of the patent statutes, I have explained the principle and mode of practicing my invention, and have described what I now consider to represent its best embodiment. However, I desire to have it understood that, within the scope of the appended claims, the invention may be practiced other than as specifically described.

I claim:

1. That method of making fused magnesium orthosilicate which comprises melting magnesium silicate rock in contact with a reducing agent for iron compound present in said rock, said agent being supplied in an amount not substantially greater than required to reduce to the metallic state the iron and metals on either side of iron in the periodic system which have atomic numbers between 24 and 28, separating the fused silicate from the reduced iron, and recovering said fused silicate.

2. That method of making fused magnesium orthosilicate which comprises melting magnesium silicate rock in contact with magnesia and with a reducing agent for iron compound present in said rock, said agent being supplied in an amount not substantially greater than required to reduce to the metallic state the iron and metals on either side of iron in the periodic system which have atomic numbers between 24 and 28, separating the fused silicate from the reduced iron, and recovering said fused silicate.

3. That method of making fused magnesium orthosilicate which comprises melting magnesium silicate rock in contact with magnesia and with ore of at least one metal of the group consisting of the five metals of the group having an atomic number between 24 and 28 and contacting the mixture with a reducing agent for iron compound present in said rock, said agent being supplied in an amount not substantially greater than required to reduce to the metallic state the iron and the said metals, separating the fused silicate from the reduced iron alloy, and recovering said fused silicate.

4. A method according to claim 1, said reducing agent being carbonaceous.

5. A method according to claim 2, said reducing agent being ferrochrome.

6. A method according to claim 3, said reducing agent being carbonaceous.

7. A method according to claim 3, said reducing agent comprising carbon monoxide.

8. A method according to claim 2, said reducing agent comprising carbon monoxide and ferrochrome.

9. That method of making fused magnesium orthosilicate refractory which comprises melting magnesium silicate rock in contact with magnesia, reducing iron and compounds of metals lying on either side of iron which have atomic numbers between 24 and 28 that are present in the melt while avoiding contact of solid carbonaceous reducing agent, separating the fused silicate from reduced metal, and recovering said fused silicate.

10. A method according to claim 9, said rock being mixed with ore of a metal capable of alloying with iron.

11. A method according to claim 9, said reduction being effected at least in part by ferrochrome.

12. A method according to claim 9, said reduction being effected at least in part by ferrochrome and carbon monoxide.

13. A method according to claim 9 in which said reduction is carried out to give a product whose ratio Mg:Si is from 2:1 to 3.3:1.

14. A method according to claim 9 in which said rock is mixed with ore of a metal capable of being alloyed with iron, and said reduction is carried out to give a product whose ratio Mg:Si is from 2:1 to 3.3:1.

VICTOR MORITZ GOLDSCHMIDT.

Certificate of Correction

Patent No. 2,418,026.                                                                                          March 25, 1947.

VICTOR MORITZ GOLDSCHMIDT

It is hereby certified that error appears in the printed specification of the above numbered patent requiring correction as follows: Column 2, line 25, for "MgSiO" read $Mg+SiO$; and that the said Letters Patent should be read with this correction therein that the same may conform to the record of the case in the Patent Office.

Signed and sealed this 27th day of May, A. D. 1947.

[SEAL]

LESLIE FRAZER,
*First Assistant Commissioner of Patents.*